United States Patent Office 3,330,805
Patented July 11, 1967

---

3,330,805
POLYMERIC HETEROCYCLIC PHOSPHORUS AMIDES
Morris L. Nielsen, Dayton, Ohio, assignor to Monsanto Research Corporation, St. Louis, Mo., a corporation of Delaware
No Drawing. Filed Dec. 24, 1963, Ser. No. 333,183
7 Claims. (Cl. 260—47)

ABSTRACT OF THE DISCLOSURE

A polymeric product having as a repeating unit a heterocyclic phosphorus amide consisting of a phosphorus-substituted oxydibenzimidazole, useful as a heat-stable adhesive for laminates; and the oxydibenzimidazole compound useful in preparing such polymers.

---

This invention relates to polymeric heterocyclic amides of phosphorus acids and to methods of preparing the same, are more particularly provides new and valuable polymers of certain heterocyclic phosphorus amides and new benzimidazole compounds from which the polymeric amides are prepared.

An object of the invention is to prepare highly heat-resistant polymeric compounds. Another object of the invention is the provision of polymers having very good resistance to solvents. Still another object of the invention is the provision of moldable compositions having high thermal stability. A further object of the invention is the provision of a heterocyclic nitrogen reactant of particular utility for the preparation of moldable and extrudable polymers of high stability to heat and solvents.

These and other objects of the invention hereinafter defined are provided by the invention wherein there are prepared solid resinous materials by the condensation of certain diimidazol-1-yl compounds with a 5,5'-oxydibenzimidazole compound substantially according to the scheme:

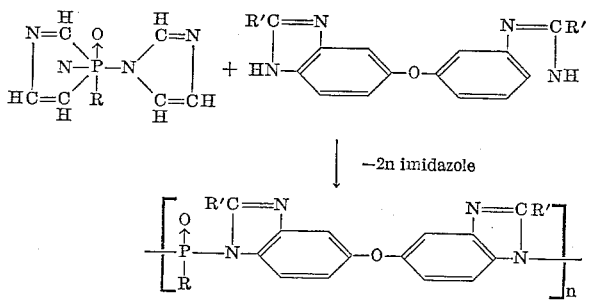

where R is selected from the class consisting of (1) aromatic hydrocarbon radicals which are free of olefinic and acetylenic unsaturation, contain from 6 to 12 carbon atoms, and are linked through nuclear carbon to the remainder of the molecule and (2) -N(hydrocarbyl)₂ radicals wherein hydrocarbyl is free of olefinic and acetylenic unsaturation and contains from 1 to 12 carbon atoms, and R' is selected from the class consisting of hydrogen and alkyl radicals of from 1 to 5 carbon atoms, and $n$ denotes the degree of polymerization.

The presently useful diimidazol-1-yl compounds may be the diimidazol-1-ylhydrocarbylphosphinic oxides (I)
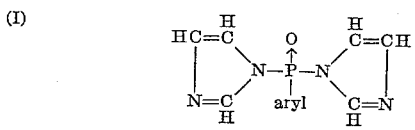

where aryl denotes the aromatic hydrocarbon radical defined above, or the P,P - diimidazol-1-yl-N,N-dihydrocarbylphosphinic amides (II)
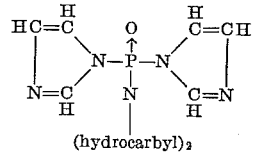
(hydrocarbyl)₂ where hydrocarbyl is as above defined.

The phosphine oxides (I) are obtained by reaction of an aromatic hydrocarbylphosphonic dihalide with imidazole as described in the copending application of R. Z. Greenley and M. L. Nielsen, Ser. No. 294,179, filed July 10, 1963, now U.S. Patent 3,227,727, or by the reaction of an imidazol-1-ylmetal compound, e.g., imidazol-1-yl-potassium, with a hydrocarbylphosphonic dihalide, as described in the copending application of L. P. Parts, Ser. No. 326,226, filed Nov. 26, 1963, now U.S. Patent No. 3,227,728. When employing imidazole as reactant, condensation takes place substantially according to the scheme:

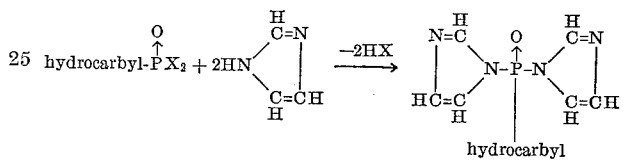

When using imidazol-1-ylmetal, reaction occurs as follows:

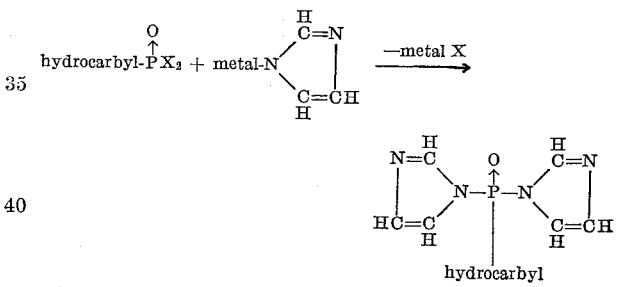

The metal component is preferably alkali or alkaline earth metal. The by-product hydrogen halide which is formed as by-product when the reactant is imidazole, rather than an imidazol-1-ylmetal, is advantageously removed from the reaction zone by operating in the presence of a hydrogen halide scavenger, i.e., a compound which reacts with the evolved halide as soon as it is formed, preferably to give a compound which is insoluble in the reaction mixture. This may be effected by employing an excess of the imidazole or by using another organic nitrogenous compound which forms a hydrohalide salt. When imidazol-1-ylmetal is used as a reactant, rather than imidazole, the by-product is a metal halide. Since it does not affect the reactants or product and because it is generally insoluble in the reaction mixture, the operating problems resulting from use of imidazole do not exist when imidazol-1-ylmetal is employed as starting material for preparation of the diimidazol-1-ylhydrocarbylphosphine oxides.

Reactions with either imidazole or with said metal compound may be conducted in the presence or absence of an inert organic liquid diluent or solvent, e.g., xylene, kerosene, dioxane, an alkylene glycol diether, diglyme, dimethyl sulfoxide, etc. Generally the reactions are exothermic; hence, no extraneous heating need be applied. However, to assure completion of the reactions within the minimum time, heating up to reflux may be employed.

As stated above, instead of the above-described diimidazol-1-ylhydrocarbylphosphine oxides there may be used, in the reaction with the 5,5'-oxydibenzimidazole compounds, analogous compounds in which the hydrocarbyl radical is replaced by a disubstituted amine group, but in which the two imidazol-1-yl radicals and the =P→O moiety are still present, i.e., the P,P-diimidazol-1-yl-N,N-dihydrocarbylphosphinic amides having the structure (II) shown hereinbefore.

The P,P-diimidazol-1-yl - N,N - hydrocarbylphosphinic amides are obtained by the reaction of imidazole with an appropriate dihydrocarbylphosphoramidic dichloride, as disclosed in the copending application of R. Z. Greenley and M. L. Nielsen, Ser. No. 576,537, filed Sept. 1, 1966, as a continuation-in-part of application Ser. No. 333,194, filed Dec. 24, 1963, and now abandoned. For example, reaction of imidazole with diphenylphosphoramidic dichloride gives P,P-diimidazol-1-yl-N,N-diphenylphosphinic amide, substantially according to the scheme:

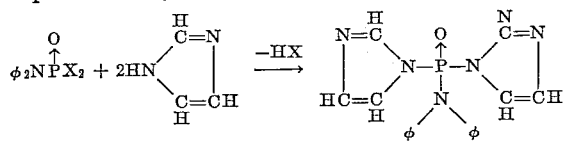

wherein X is halogen having an atomic weight greater than 34 and φ denotes the phenyl radical. Reaction is generally effected in the presence of a hydrogen halide scavenger. This may be either an excess of imidazole above that required for formation of the P,P-diimidazol-1-yl-N,N-dihydrocarbylphosphinic amide or it may be a tertiary organic amine, e.g., triethylamine which is known to form hydrohalide salts. Usually, the dihydrocarbylphosphoramidic dichlorides react exothermally with imidazole to form said phosphinic amides; hence, external heating is unnecessary. However, to assure complete reaction with the minimum reaction time, application of heat after initial reaction has subsided is usually advantageous. Operation in the presence of an inert, organic diluent or solvent, e.g., xylene, kerosene, dimethylformamide, dioxane, 1,2-dimethoxyethane, or tetrahydrofuran serves to obtain a smooth, readily controlled reaction, though a diluent or solvent need not be employed.

The 5,5'-oxydibenzimidazoles with which the diimidazol-1-ylhydrocarbylphosphine oxides or the P,P-diimidazol-1-yl-N,N-dihydrocarbylphosphinic amides are reacted to give the presently provided new, resinous polymers are previously unknown compounds which are prepared, according to this invention, by the reaction of bis(3,4-diaminophenyl) ether with a monocarboxylic acid substantially according to the scheme:

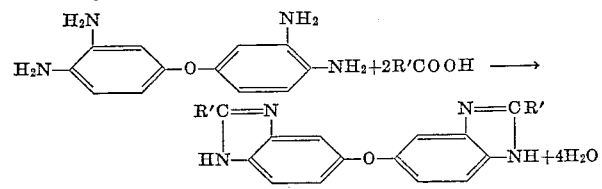

where R' is hydrogen or an alkyl radical of from 1 to 5 carbon atoms. There are thus provided, e.g., 5,5'-oxydibenzimidazole by reaction of the bis(3,4-diaminophenyl) ether with formic acid; 5,5'-oxybis(2-methylbenzimidazole) from said ether and acetic acid, 5,5'-oxybis(2-ethylbenzimidazole) from said ether and propionic acid, or 5,5'-oxybis(2-propylbenzimidazole) from said ether and butyric acid. Similarly the use of valeric acid or hexanoic acid as the carboxylic acid constituent yields 5,5'-oxybis(2-butyl- or 2-pentylbenzimidazole).

Reaction of the bis(3,4-diaminophenyl) ether with the carboxylic acid takes place by simply heating the two reactants at, say, a temperature of from 60° C. to 200° C., preferably at reflux, at ordinary, decreased or increased pressure and in the presence of an inert organic liquid as diluent. A catalyst may or may not be employed. When no diluent is used and the carboxylic acid is substantially anhydrous, a catalyst is quite unnecessary, although the use of a catalyst will often accelerate the reaction and thereby permit a substantially shorter heating time. Acidic catalysts, e.g., inorganic mineral acids or acidic salts thereof or aromatic sulfonic acids such as p-toluenesulfonic acid, are particularly useful as catalysts for the reaction, and a convenient method of operation involves working with an inorganic salt of the amino ether in the presence of the salt-forming mineral acid, e.g., bis(3,4-diaminophenyl) ether tetrahydrochloride is reacted in the presence of hydrochloric acid as catalyst, or the tetrasulfate is reacted in the presence of sulfuric acid as catalyst.

Inasmuch as the 5,5'-oxydibenzimidazole is formed by reaction of one mole of the bis(3,4-diaminophenyl) ether with two moles of the carboxylic acid, the two reactants are advantageously employed in such stoichiometric proportions. However, an excess of either reactant may be employed, since any unreacted material is readily separated from the desired 5,5'-oxydibenzimidazole compound, e.g., by distillation, solvent extraction, etc. The condensation results in formation of water as by-product; hence, the reaction is conveniently and efficiently conducted by working at temperatures which permit volatilization of the by-product water and with equipment, e.g., a water trap, which permits removal of the water as it is formed. To facilitate removal of the water, the reaction may also be conducted in the presence of an organic diluent which forms an azeotrope with water, e.g., toluene or xylene. Other solvents or diluents which may be employed are, e.g., hexane, hexachloroethane, acetone, nitrobenzene, dioxane, dimethylformamide, etc.

The 5,5'-oxydibenzimidazoles are stable, high-melting compounds which are particularly valuable for the preparation of the presently provided polymeric phosphorus heterocyclic amides. Thus, reaction of 5,5'-oxydibenzimidazole with diimidazol-1-ylphenylphosphine oxide to obtain a solid polymeric product proceeds as follows:

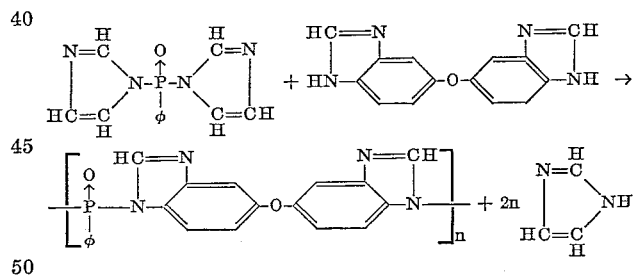

wherein φ denotes phenyl and n denotes the degree of polymerization.

It proceeds in the same manner with the P,P-diimidazol-1-yl-N,N-dihydrocarbylphosphinic amides, thus:

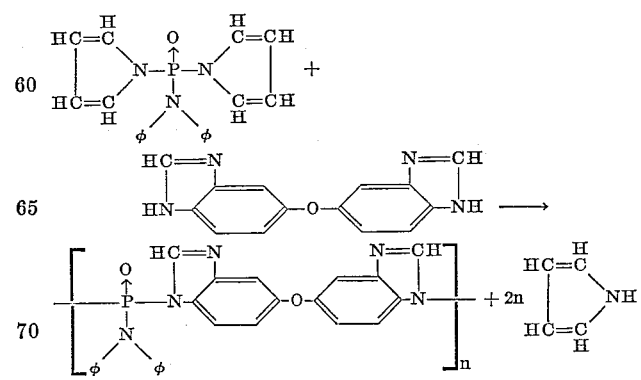

where φ denotes the phenyl radical and n denotes the the degree of polymerization.

Examples of the presently useful diimidazol-1-ylhydrocarbylphosphine oxides include those in which the hydrocarbyl radical is aromatic, is linked through nuclear carbon to the remainder of the molecule, is free of olefinic and acetylenic unsaturation and contains as many as 12 carbon atoms, e.g., diimidazol-1-ylphenylphosphine oxide, diimidazol-1-yl-o-(m- or p)-tolyl-phosphine oxide, diimidazol-1-yl-α-naphthylphosphine oxide, diimidazol-1-yl-α-methyl-β-naphthylphosphine oxide, diimidazol-1-ylbiphenylylphosphine oxide, diimidazole-1-yl-(o-, m- or p-hexylphenyl)phosphine oxide, diimidazol-1-yl pentamethylphenyl)phosphine oxide, diimidazol - 1 - yl-(o-, m- or p-cyclohexylphenyl)phosphine oxide, etc.

Examples of presently useful P,P-diimidazol-1-yl-N,N-dihydrocarbylphosphinic amides are P,P-diimidazol-1-yl-N,N-dimethyl-, or N,N-dibutyl-, or N,N-dihexyl-, or N,N-dioctyl-, or N,N-didodecyl-, or N-ethyl - N - methyl-, or N,N-diphenyl- or N,N-di-o-, m-, or p-tolyl-, or N,N-bis (hexylphenyl)-, or N-butyl-N-phenyl-, or N,N-di-β-naphthyl-, or N,N-di - p - biphenylyl, or N,N-bis(cyclohexylphenyl)-, or N,N - di-3-acenaphthenylphosphinic amide, etc.

Reaction of 5,5'-oxydibenzimidazole or of a 5,5'-oxybis(2,2'-dialkylbenzimidazole) with the diimidazol-1-ylhydrocarbylphosphine oxide or with the P,P-diimidazol-1-yl-N,N-dihydrocarbylphosphinic amide, takes place with production of the desired oxydibenzimidazole polymer and formation of imidazole as by-product. This by-product is readily recovered and is used for making a new supply of diimidazol-1-ylhydrocarbylphosphine oxides or the P,P-diimidazol - 1 - yl - N,N-dihydrocarbylphosphinic amides for the presently provided polymerization reaction.

Preparation of the polymer, according to the invention, takes place by simply heating the phosphine oxide or the phosphinic amide with the 5,5'-oxydibenzimidazole compound at temperatures of from, say, 100° C. to 300° C., at ordinary, decreased or increased pressure and in the presence or absence of a liquid diluent or solvent. The reaction takes place readily in the absence of a catalyst; however, a catalyst, preferably basic, may be employed. The nature of solvent or diluent will depend upon the specific reactants which are used as well as upon the temperature and pressure conditions. Virtually any organic liquid which is inert under the reaction conditions may be used as diluent; and as will be obvious to those skilled in the art, a low-boiling diluent generally will not be employed when the process is conducted at high temperatures or under substantially decreased pressure. Examples of useful diluents are dioxane, tetrahydrofuran, benzene, xylene, nitrobenzene, dimethylsulfoxide, dimethylformamide, 1,2 - dimethoxyethane, diglyme, quinoline, 1-methyl-2-pyrrolidone, etc. The use of a solvent will depend to some extent upon the nature of the reactants as well as upon the extent of heating. When the reactants melt readily at the contemplated reaction temperature, a diluent need not be used unless the phosphine oxide is extremely reactive. In that case, the use of an inert diluent will serve to moderate the reaction. With high-melting reactants, the use of a solvent provides for conducting the polymerization reaction at temperatures which may be significantly lower than the temperatures at which the reactants melt. With respect to the temperature at which reaction is effected, there must be taken into consideration the nature of the reactants, whether or not a catalyst and/or diluent is used and the pressure at which the reaction is conducted. In some cases the polymerization may be conducted by warming, say, at temperatures of from 100° C. to 200° C. at ordinary atmospheric pressure. In other instances, heating of the reaction mixture at higher temperatures, say, at temperatures of from 200° C. to 300° C., and preferably at from 220° C. to 280° C., will be found to give optimum conversion. Operating in an inert atmosphere, e.g., nitrogen or argon, may be desirable, but not necessary. All of these variables, i.e., use of and nature of diluent, inert atmosphere, catalyst, temperature and pressure, can readily be arrived at by easy experimentation. Since reaction is evidenced by a change in viscosity, the extent of such change will be indicative of reaction. Very rapid reaction, as evidenced by rapid viscosity change will show the need for a diluent and/or lower temperature and/or shorter heating and/or no catalyst if one has been employed. Conversely, no reaction or only a very slow reaction will indicate the use of more extreme conditions. Thus, arrival at optimum reaction conditions is simply a matter of routine procedure by one skilled in the art. To assure complete reaction in experimental runs, it is generally recommended that the temperature of the reaction mixture be increased after the primary reaction has subsided. Completion of the reaction can then be ascertained by simply noting cessation in change of viscosity.

When the polymerization has been effected in the absence of a solvent or diluent and the reactants are employed in the stoichiometric proportions, the polymer is generally recovered from the reaction mixture by simply providing for volatilization of the imidazole either during or after the polymerization reaction is completed. The polymer may also be obtained from the reaction mixture by precipitating it from a non-solvent, whereby the by-product imidazole or pyrrole remains in solution. When the reaction is effected in the presence of a diluent which is a non-solvent for the polymer, the precipitated polymer is simply filtered off, washed and dried. When the reaction is conducted in a liquid which is a solvent for the polymer, the latter is separated from the reaction mixture by mixing with a liquid which is a non-solvent for the polymer. The by-product imidazole is more soluble than the oxydibenzimidazole polymer; this fact permits easy removal of the imidazole by washing.

To recapitulate: In the preparation of the phosphorus-containing, 5,5'-oxydibenzimidazole polymers, a diimidazol - 1 - ylarylphosphine oxide or a P,P-diimidazol-1-yl-N,N-dihydrocarbylphosphinic amide or a mixture of the same is reacted with the oxydibenzimidazole compound in the presence or absence of an inert diluent or solvent and in the presence or absence of catalyst at a temperature which may be as low as, say, 100° C. and as high as, say, 300° C., at ordinary, increased or decreased pressure. The phosphine oxide or phosphinic amide and the 5,5'-oxydibenzimidazole compound are employed in substantially stoichiometric proportions; however, an excess of either reactant can be employed, since unreacted material is readily separated from the polymer product. There may be used a mixture of a phosphine oxide and a phosphinic amide, i.e., a mixture of diimidazol -1-ylphenylphosphine oxide and P,P-diimidazol-1-yl-N,N-diphenyl phosphinic amide. Likewise, there may be used a mixture of two or more different phosphine oxides or two or more different phosphinic amides in any proportion, say, a 2:1 mixture of diimidazol-1-ylphenylphosphine oxide and diimidazol-1-yl-o-tolylphosphine oxide, or a 2:1 mixture of diimidazol -1-yl-N,N-diethylphosphinic amide and diimidazol-1-yl-N,N-di-p-tolylphosphine amide. Also, there may be used a mixture of oxydibenzimidazoles, say, a 1:1 mixture of 5,5'-oxydibenzimidazole and 5,5'-oxybis(2-methylbenzimidazole) to obtain polymers having various linkages dispersed more or less randomly in the polymer chain .

The presently prepared oxydibenzimidazole polymers range from waxy to high-melting solids. Of particular importance, however, are those polymers which are solid, resinous materials. Such products are readily molded under heat and pressure to give shaped molded objects which are tough, transparent, of good dimensional stability and highly resistant to heat and solvents. The polymers may also be cast into films from solutions thereof or fibers may be prepared therefrom by extruding the polymers through a suitable orifice into a precipitating bath. Solutions of the solid polymers are useful as impregnating agents and adhesives in the manufacture of laminates and as the resin bases of coatings, i.e., paints, varnishes, lacquers and enamels.

The invention is further illustrated by, but not limited to, the following examples.

EXAMPLE 1

A solution consisting of 9.2 g. (0.04 mole) of bis(3,4-diaminophenyl) ether, 50 ml. of water, 50 ml. of concentrated hydrochloric acid and 35 ml., 42 g. (0.9 mole) of formic acid was heated to reflux within 30 minutes. The solution was then cooled and poured, slowly with stirring, onto a mixture of 100 g. of ice and 200 ml. of concentrated ammonium hydroxide. After filtration, washing and drying, there was obtained 9.7 g. of crude product. It was decolorized in methanol solution with carbon, then precipitated with water as white needles and dried under vacuum at 60° C. to give 5,5'-oxydibenzimidazole monohydrate, decomposing at 138–140° C. and analyzing as follows:

| Percent | Found | Calc'd for $C_{14}H_{10}N_4O \cdot H_2O$ |
|---|---|---|
| C | 62.85 | 62.34 |
| H | 4.70 | 4.48 |
| N | 20.69 | 20.77 |

The monohydrate was soluble in ethanol, dioxane and acetonitrile, slightly soluble in hot water, very slightly soluble in hot benzene, and insoluble in acetone, 1,2-dimethoxyethane, ethyl acetate, chloroform or hexane.

Drying of the monohydrate in vacuum at 100° C. and recrystallizing from acetonitrile gave the substantially pure 5,5'-oxydibenzimidazole, M.P. 241–2° C., and analyzing as follows:

| Percent | Found | Calc'd for $C_{14}H_{10}N_4O$ |
|---|---|---|
| C | 67.05 | 67.19 |
| H | 4.15 | 4.03 |
| N | 22.41 | 22.39 |

EXAMPLE 2

To a stirred solution of 17.0 g. (0.25 mole) of imidazole in 400 ml. of tetrahydrofuran there was added a solution of 12.2 g. (0.063 mole) of phenylphosphonic dichloride in 75 ml. of tetrahydrofuran, over a 15-minute period and under nitrogen. The reaction was then stirred at gentle reflux for 3 hours. After cooling to room temperature, the solid imidazole hydrochloride which had formed as by-product was filtered off under nitrogen by means of a filter stick, and the product was obtained in tetrahydrofuran solution. Removal of the tetrahydrofuran by distillation and vacuum drying of the residual white solid gave the substantially pure diimidazol-1-ylphenylphosphine oxide, M.P. 98–100° C., giving by nuclear magnetic resonance analysis in dimethylformamide for $P^{31}$ a single peak at −6 p.p.m. with reference to 85% $H_3PO_4$.

EXAMPLE 3

In a flask which was equipped with a tightly fitted, Z-shaped condenser, a mixture consisting of 2.358 g. (0.0091 mole) of diimidazol-1-ylphenylphosphine oxide and 2.285 g. (0.0091 mole) of 5,5'-oxydibenzimidazole was heated in a nitrogen atmosphere to a temperature of 235° C. within 1.5 hours. During this time, melting of the reaction mixture and condensation of by-product imidazole was noted to occur at 150°–165° C., and at 225° C. the reaction mixture had become quite viscous. The whole was cooled to 100° C., and oil-pump vacuum was applied to the system. The reaction mixture was heated under vacuum to 250° C. within about an hour. At 180° C. the evolved gases caused foaming of the reaction mixture, but as the temperature reached 200° C. and more imidazole condensed out, the foaming subsided. Heating at 250° C. was conducted for 4.5 hours. There was thus obtained 1.11 g. of imidazole from the condenser and, as residue, 3.53 g. of a polymer consisting essentially of the repeating unit

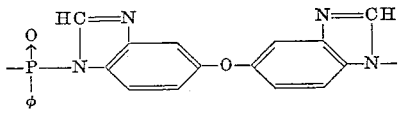

wherein $\phi$ denotes phenyl.

The polymer, an easily crushed solid, softened when heated in air at a temperature of 260–270° C., and was soluble in quinoline at room temperature. It analyzed as follows:

| Percent | Found | Calc'd for $C_{20}H_{13}N_4O_2P$ |
|---|---|---|
| C | 64.35 | 64.52 |
| H | 3.63 | 3.52 |
| N | 15.14 | 15.05 |
| P | 8.15 | 8.32 |

A very thermally stable coating was given to steel by applying the polymer in quinoline solution and baking to remove the solvent.

EXAMPLE 4

A solution of 2.348 g. (0.0091 mole) of diimidazol-1-ylphenylphosphine oxide and 2.280 g. (0.0091 mole) of 5,5'-oxydibenzimidazole in 20 ml. of quinone was heated, in a nitrogen atmosphere, for 1.25 hours at a temperature of 155° to 260° C. The temperature was then maintained at 260° C. for 0.5 hour, and then vacuum was carefully applied through the Dry Ice trap with which the reaction vessel was equipped. The temperature was maintained under vacuum at 260° C. for an additional 0.5 hour, at which point practically all of the by-product imidazole had condensed out. Vacuum was applied for another hour in order to remove traces of by-product imidazole. There was thus obtained as residue, 3.770 g. of the substantially pure polymer which consisted essentially of the repeating unit

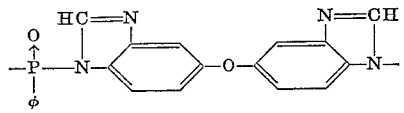

wherein $\phi$ denotes phenyl.

The polymer, a dark brittle solid, softened at 200–220° C., dissolved at room temperature in quinoline, and analyzed as follows:

| Percent | Found | Calc'd for $C_{20}H_{13}N_4O_2P$ |
|---|---|---|
| C | 64.61 | 64.52 |
| H | 3.70 | 3.52 |
| N | 15.05 | 15.05 |
| P | 8.19 | 8.19 |

EXAMPLE 5

To 17.00 g. (0.25 mole) of imidazole in 400 ml. of dry tetrahydrofuran there was added 14.00 g. (0.0625 mole) of methylphenylphosphoramidic dichloride in 75 ml. of tetrahydrofuran during a 20-minute period. The mixture was stirred at gentle reflux under nitrogen for two hours. By-product imidazole hydrochloride was then filtered off under nitrogen by means of a filter stick. Evaporation to dryness of the filtrate gave as residue an 81% theoretical yield of the substantially pure P,P-diimidazol-1-yl-N- methyl-N-phenylphosphinic amide, M.P. 122–123° C., and analyzing as follows:

| Percent | Found | Calc'd for $C_{13}H_{14}N_5OP$ |
|---|---|---|
| C | 54.06 | 54.35 |
| H | 4.79 | 4.91 |
| N | 24.10 | 24.38 |
| P | 10.50 | 10.79 |

Nuclear magnetic resonance analysis of the compound in dimethylformamide for $P^{31}$ gave a chemical shift at +7.6 p.p.m. with reference to 85% $H_3PO_4$.

EXAMPLE 6

To a flask which was fitted with a Dry Ice trap there were charged 3.34 g. (0.012 mole) of P,P-diimidazol-1-yl-N-methyl-N-phenylphosphinic amide, 2.92 g. (0.012 mole) of 5,5'-oxydibenzimidazole and 20 ml. of dry quinoline. The flask was placed in an oil bath which had been heated to 150° C. and the reaction mixture was heated to 255° C. in a nitrogen atmosphere within 41 minutes. It was held at 255° C. for 30 minutes, vacuum was applied and heating under vacuum at 260° C. was continued for 1.5 hours, at which point by-product imidazole had ceased to appear in the trap. There was thus obtained, as residue in the reaction vessel, 4.87 g. of a polymer consisting of the repeating unit

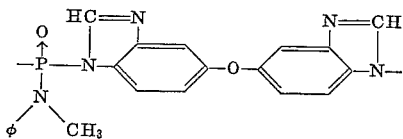

wherein φ denotes phenyl, which analyzed as follows:

| Percent | Found | Calc'd for $C_{21}H_{16}N_5PO_2$ |
|---|---|---|
| C | 62.83 | 62.84 |
| H | 4.03 | 4.02 |
| N | 17.43 | 17.45 |
| P | 7.71 | 7.72 |

The polymer, a dark brown, solid resin, softened in air when heated at 250–260° C.

EXAMPLE 7

A mixture consisting of 2.77 g. (0.01 mole) of P,P-diimidazol-1-yl-N-methyl-N-phenylphosphinic amide and 2.41 g. (0.01 mole) of 5,5'-oxydibenzimidazole was heated in a nitrogen atmosphere to 230° C. within 1.5 hours. The reaction mixture was cooled to 120° C. and vacuum was applied to the system through a condenser which was attached to the reaction vessel. Heating under vacuum to a temperature of 300° C. was effected within 1.5 hours and the reaction mixture was maintained at 300° C., still under vacuum for 0.5 hour. By-product imidazole had collected in the condenser, and there was obtained as residue in the reaction vessel 3.72 g. of a solid polymer consisting essentially of the repeating unit

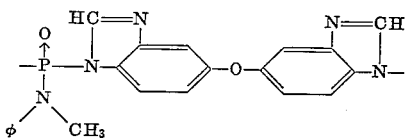

wherein φ denotes phenyl.

The polymer analyzed as follows:

| Percent | Found | Calc'd for $C_{21}H_{16}N_5PO_2$ |
|---|---|---|
| C | 62.59 | 62.84 |
| H | 3.93 | 4.02 |
| N | 17.64 | 17.45 |
| P | 7.72 | 7.72 |

The polymer, a dark brown solid, softened when heated in air at 290–300° C., and was slightly soluble in quinoline and in 1-methyl-2-pyrrolidinone. Molding of the polymer at a temperature of 300° C. and a pressure of 10,000 p.s.i. gave a smooth, hard, well-dimensioned pellets having an electrical resistivity of >100 megohms/0.125".

The above examples are given by way of illustration only, and the present invention is not to be considered as limited by them. It will be obvious to those skilled in the art that many modifications can be made within the spirit of the invention, which is limited only by the terms of the appended claims.

What I claim is:

1. A solid polymeric material consisting essentially of the repeating unit

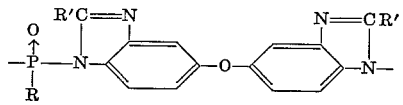

wherein R is selected from the class consisting of (1) aromatic hydrocarbon radicals which are free of olefinic and acetylenic unsaturation, contain from 6 to 12 carbon atoms and are linked through nuclear carbon to the remainder of the molecule, and (2) —N(hydrocarbyl)$_2$ radicals wherein hydrocarbyl is free of olefinic and acetylenic unsaturation and contains from 1 to 12 carbon atoms, and R' is selected from the class consisting of hydrogen and alkyl radicals of from 1 to 5 carbon atoms.

2. A solid polymeric material consisting essentially of the repeating unit

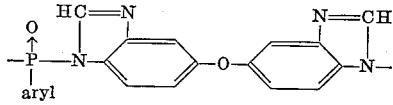

wherein aryl denotes an aromatic hydrocarbon radical which is free of olefinic and acetylenic unsaturation, contains from 6 to 12 carbon atoms, and is linked through nuclear carbon to the remainder of the molecule.

3. A solid polymeric material consisting essentially of the repeating unit

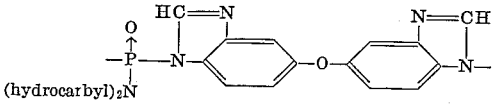

wherein hydrocarbyl is free of olefinic and acetylenic unsaturation and contains from 1 to 12 carbon atoms.

4. A solid polymeric material consisting essentially of the repeating unit

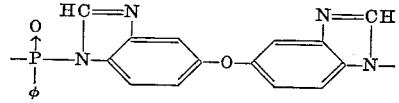

wherein φ denotes phenyl.

5. A solid polymeric material consisting essentially of the repeating unit

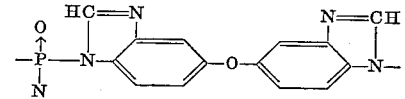

wherein φ denotes phenyl.

6. A compound of the formula
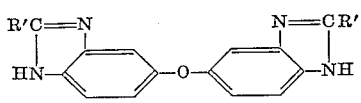
in which R' is selected from the class consisting of hydrogen and alkyl radicals of from 1 to 5 carbon atoms.
7. 5,5'-oxydibenzimidazole.
References Cited
UNITED STATES PATENTS
3,173,886  3/1965  Greenley et al. ......... 260—2
OTHER REFERENCES
Brown et al.: Australian J. Chem. 12, 543–553 (1959), p. 548 relied on.
SAMUEL H. BLECH, *Primary Examiner.*
WILLIAM H. SHORT, *Examiner.*
M. GOLDSTEIN, *Assistant Examiner.*

UNITED STATES PATENT OFFICE
CERTIFICATE OF CORRECTION

Patent No. 3,330,805                                July 11, 1967

Morris L. Nielsen

It is hereby certified that error appears in the above numbered patent requiring correction and that the said Letters Patent should read as corrected below.

Column 1, line 22, for "are" read -- and --; same column 1, lines 40 to 45, the formula should appear as shown below instead of as in the patent:

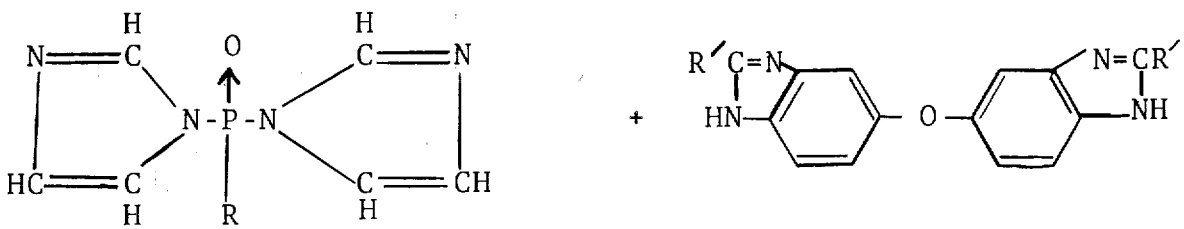

column 5, line 11, for "diimidazol-1-yl pentamethyl-" read -- diimidazol-1-yl(pentamethyl- --; column 6, line 26, for "pyrrolle" read -- pyrrole --; column 9, in the first table, second column, line 2 thereof, for "4.79" read -- 4.97 --.

Signed and sealed this 7th day of January 1969.

(SEAL)
Attest:

EDWARD M.FLETCHER,JR.                    EDWARD J. BRENNER
Attesting Officer                           Commissioner of Patents